(12) United States Patent
Park et al.

(10) Patent No.: US 8,319,732 B2
(45) Date of Patent: Nov. 27, 2012

(54) DATA INPUT APPARATUS, MEDIUM, AND METHOD DETECTING SELECTIVE DATA INPUT

(75) Inventors: Dong-ryeol Park, Hwaseong-si (KR);
Seung-Nyung Chung, Seoul (KR);
Young-jin Hong, Suwon-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 1603 days.

(21) Appl. No.: 11/483,854

(22) Filed: Jul. 11, 2006

(65) Prior Publication Data
US 2007/0081728 A1    Apr. 12, 2007

(30) Foreign Application Priority Data
Oct. 7, 2005 (KR) .................. 10-2005-0094530

(51) Int. Cl.
*G09G 5/00* (2006.01)
(52) U.S. Cl. ........................... 345/168; 345/156
(58) Field of Classification Search .......... 345/168–169, 345/156–158
See application file for complete search history.

(56) References Cited

U.S. PATENT DOCUMENTS

| | | | |
|---|---|---|---|
| 6,614,422 B1 | 9/2003 | Rafii et al. | |
| 6,650,318 B1 * | 11/2003 | Arnon | 345/168 |
| 6,690,357 B1 * | 2/2004 | Dunton et al. | 345/158 |
| 6,727,890 B2 * | 4/2004 | Andres et al. | 345/168 |
| 7,091,993 B1 * | 8/2006 | Ahmad | 345/629 |
| 7,151,530 B2 * | 12/2006 | Roeber et al. | 345/168 |
| 2002/0171633 A1 | 11/2002 | Brinjes | |
| 2004/0017352 A1 * | 1/2004 | Ishigaki | 345/156 |
| 2004/0108990 A1 * | 6/2004 | Lieberman et al. | 345/156 |

FOREIGN PATENT DOCUMENTS

| | | |
|---|---|---|
| JP | 11305805 | 11/1999 |
| JP | 2000089899 | 3/2000 |
| KR | 2001-0075474 | 8/2001 |

* cited by examiner

*Primary Examiner* — Kevin M Nguyen
(74) *Attorney, Agent, or Firm* — Staas & Halsey LLP

(57) ABSTRACT

A data input apparatus, medium, and method detecting a selected data key input. The data input apparatus may include an image output module, an image input module, and a control module, with the image output module generating an input image having a predetermined number of input keys for the input of data. The image input module may capture the generated input image, and the control module may then binarize the captured images of the respective input keys, e.g., using a predetermined threshold value. Accordingly, the proper selection of input keys can be determined by comparing the binarized images with previously stored binarized images.

21 Claims, 9 Drawing Sheets

| 1 | 2 | 3 |
|---|---|---|
| 4 | 5 | 6 |
| 7 | 8 | 9 |
| * | 0 | # |

DATA INPUT APPARATUS, MEDIUM, AND METHOD DETECTING SELECTIVE DATA INPUT

CROSS-REFERENCE TO RELATED APPLICATIONS

This application claims the priority benefit of Korean Patent Application No. 10-2005-0094530 filed Oct. 7, 2005, in the Korean Intellectual Property Office, the disclosure of which is incorporated herein in its entirety by reference.

BACKGROUND OF THE INVENTION

1. Field of the Invention

Embodiments of the present invention relate to an input of data and, more particularly, to a data input apparatus, medium, and a method detecting a selective data input, which can detect the selection of differing data input from an image of selectable data inputs.

2. Description of the Related Art

With recent developments in technology, various types of input apparatuses appropriate for use in various environments have been developed.

Of the differing input apparatuses, there are optical input apparatuses that use a laser projection system, such as that discussed in U.S. Pat. No. 6,650,318, which is illustrated in FIG. 1.

Referring to FIG. 1, such a conventional optical input apparatus includes a laser image projection unit, an infrared receiving unit, such as a camera, and an infrared emitting unit.

Here, an image, having the shape of a keyboard, is projected onto a desk, for example, by the laser image projection unit to generate a virtual keyboard. In this example, the infrared emitting unit radiates the infrared laser in a horizontal line form.

When a user selects a specific key using his or her finger, for example, the infrared receiving unit can detect the location of the finger by analyzing the pattern of the infrared laser reflected by the finger.

Thereafter, the key that is selected by the user is determined based on the detected location of the finger, and a corresponding key code is transmitted to computer equipment, for example.

In another conventional system, U.S. Pat. No. 6,614,422 discusses another example in which a structure similar to that of FIG. 1 was adopted, but where an infrared receiving unit detects the contour of a finger, analyzes the overall motion of the finger, generates a key code corresponding to a key selected by the finger indicating a vertical pressing operation, and then transmits the generated key code to other equipment.

These conventional technologies are limited in that it is difficult to implement such examples with a small-sized optical input apparatus since they must essentially include a laser image projection unit, an infrared receiving unit, such as a camera, and an infrared emitting unit. In addition, the angle formed by the infrared receiving unit and the infrared emitting unit must also be kept uniform.

With these conventional examples, the angle formed by the infrared receiving unit and the infrared emitting unit may also change while the above-described optical input apparatus is used by a user, resulting in an additional problem of the key being selected by the user not being correctly detected. Further, as high-priced infrared emitting unit is an essential component, it is difficult to popularize the apparatus because of the ultimate product costs to consumers.

SUMMARY OF THE INVENTION

Accordingly, embodiments of the present invention take into consideration the above conventional problems. Aspects and advantages of embodiments of the present invention include a data input apparatus, medium, and method detecting a user's selective data input. In addition, as an additional benefit, such a technique can detect differing selections of data input without the need of an infrared emitting device.

Another aspect and/or advantage of embodiments of the present invention includes a data input apparatus, medium, and method detecting a user's selective input of data by implementing a small-sized data input apparatus with reduced manufacturing costs compared to conventional techniques.

Additional aspects and/or advantages of the invention will be set forth in part in the description which follows and, in part, will be apparent from the description, or may be learned by practice of the invention.

To achieve the above and/or other aspects and advantages, embodiments of the present invention include a data input apparatus, including an image input module to obtain an input image representing at least one selectable input, and a controller to control a binarizing of at least one respective image of at least one respective input from the obtained input image, and to control a determining selection by a user of the at least one respective selectable input based on a comparison of a corresponding binarized image of the at least one respective image with a corresponding previously stored binarized image.

The apparatus may further include an image output to generate an illumination of light, for forming an illumination on a surface, of the at least one respective selectable input, such that the obtaining of the input image includes a capturing of the illumination of light.

The at least one respective selectable input may be an image of a key representing a key from a keyboard.

In addition, the image output may further include a charge coupled device (CCD) to capture the illumination light.

The controller may provide information about a key code corresponding to the determined at least one selectable input to control a computational device based upon input of the key code.

Here, the apparatus may further include the computational device, with the apparatus being a computer.

The binarizing of the at least one respective input image may be performed based upon a predetermined threshold value, wherein the predetermined threshold value is derived based on an adaptive thresholding algorithm.

The controller may further control a calculating of differences between the corresponding binarized image of the at least one selectable input and the corresponding previously stored binarized image, on a pixel basis, and control a determining that the at least one selectable input has been selected by the user based upon a sum of the calculated differences being greater than a predetermined value.

The at least one selectable input may include a power input for controlling a drive module to control a driving of the control module.

The apparatus may further include a keypress duplication determination module determining, wherein there are a plurality of selectable inputs in the obtained input image, which of the plurality of selectable inputs that are identified as having been selected by the user, in the determining of the selection by the user of the at least one respective selectable input, should be an end determination of an actual input selection, when the identification of the selectable inputs results in identifying multiple inputs.

The keypress duplication determination module may determine which of the plurality of selectable inputs has been actually selected by the user based on weights corresponding to relative locations of the selectable inputs in the obtained input image.

To achieve the above and/or other aspects and advantages, embodiments of the present invention include a method of detecting input of data, including obtaining an input image representing at least one selectable input, binarizing at least one respective image of at least one respective selectable input from the obtained input image, and determining selection by a user of the at least one respective selectable input based on a comparison of a corresponding binarized image of the at least one respective image with a corresponding previously stored binarized image.

The method may further include generating an illumination of light, for forming an illumination on a surface, of the at least one respective selectable input, such that the obtaining of the input image includes a capturing of the illumination of light.

The at least one respective selectable input may be an image of a key representing a key from a keyboard.

The capturing of the illumination light may further be performed by a charge coupled device (CCD).

In addition, the determining of the selection of the at least one respective selectable input may further include providing information about a key code corresponding to the determined at least one selectable input to control a computational device based upon input of the key code.

The binarizing of the at least one respective input image may be performed based upon a predetermined threshold value, wherein the predetermined threshold value is derived based on an adaptive thresholding algorithm.

The determining of the selection of the at least one respective selectable input may include calculating differences between the corresponding binarized image of the at least one selectable input and the corresponding previously stored binarized image, on a pixel basis, and determining that the at least one selectable input has been selected by the user based upon a sum of the calculated differences being greater than a predetermined value.

The method may further include determining, where there are a plurality of selectable inputs in the obtained input image, which of the plurality of selectable inputs that are identified as having been selected by the user, in the determining of the selection by the user of the at least one respective selectable input, should be an end determination of an actual input selection, when the identification of the selectable inputs results in identifying multiple inputs.

Here, the determining of which of the plurality of selectable inputs are the actual input selection may further include determining which of the plurality of selectable inputs has been actually selected by the user based on weights corresponding to relative locations of the selectable inputs in the obtained input image.

To achieve the above and/or other aspects and advantages, embodiments of the present invention include at least one medium including computer readable code to implement embodiments of the present invention.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF THE PREFERRED EMBODIMENTS

Figure 1:
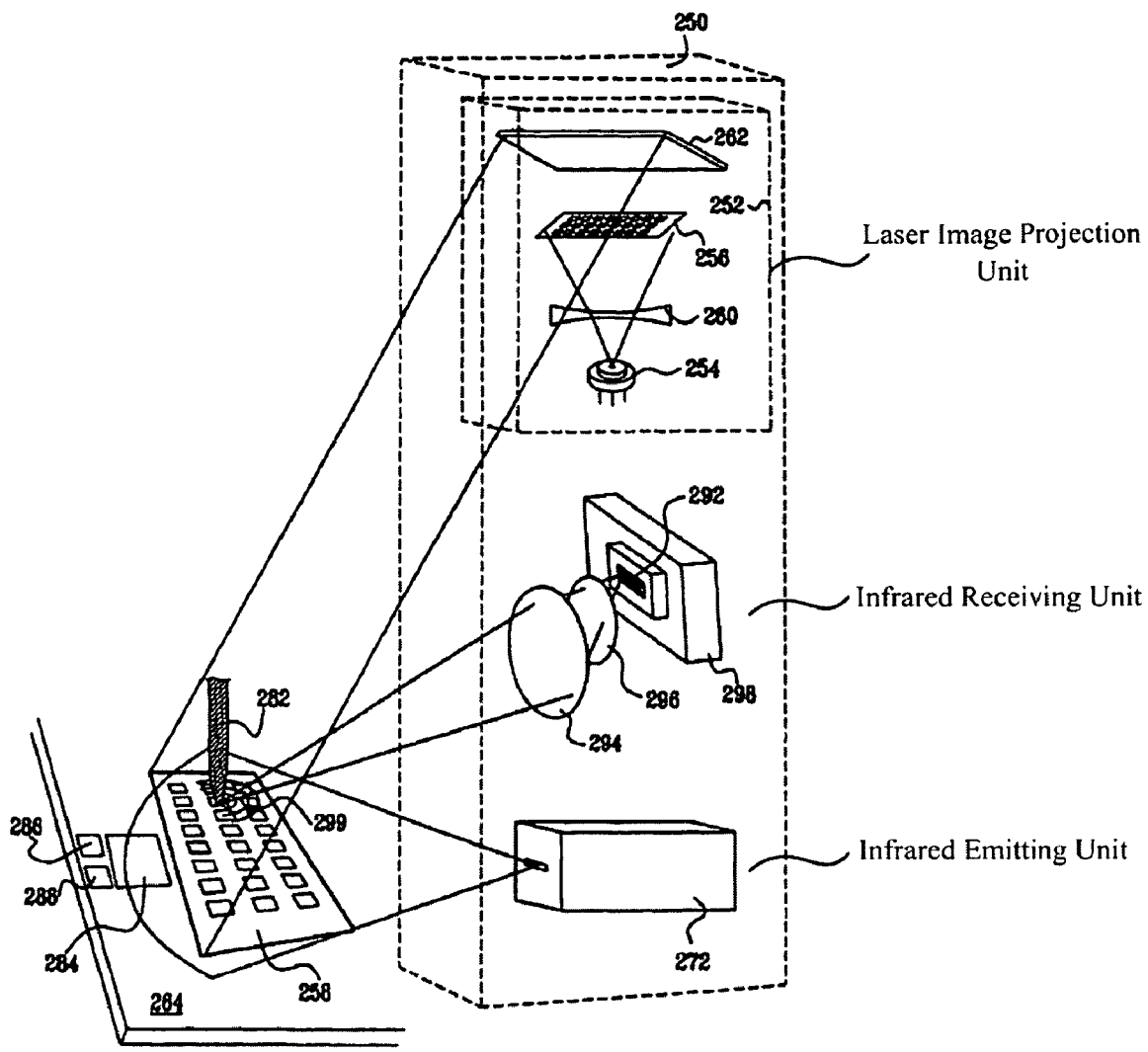
FIG. 1 illustrates a conventional optical input apparatus.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
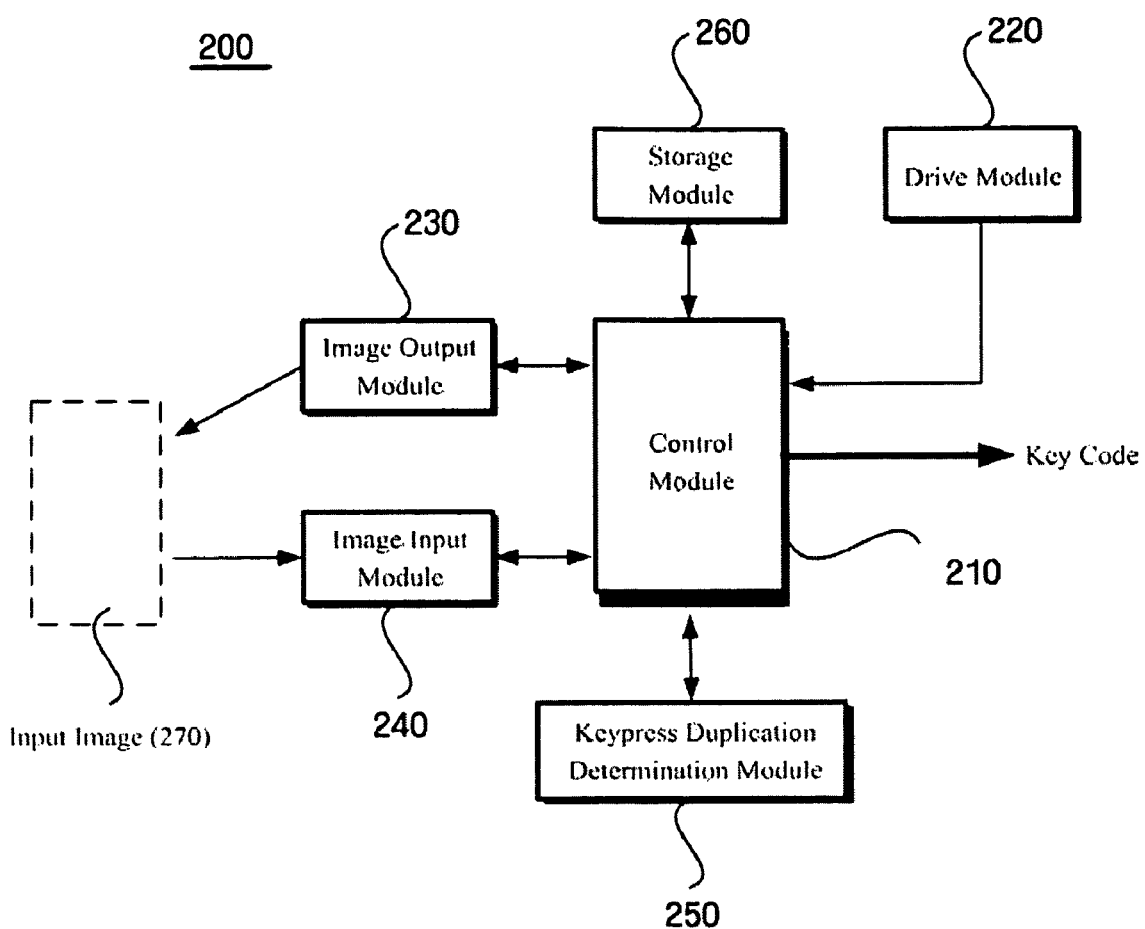
FIG. 2 illustrates a data input apparatus, according to an embodiment of the present invention.

FIG. 2 illustrates a data input apparatus, according to an embodiment of the present invention.

Referring to FIG. 2, the data input apparatus 200 may include a control module 210, a drive module 220, an image output module 230, an image input module 240, a keypress duplication determination module 250, and a storage module 260, for example. Here, an input image 270 for illuminating a surface with available data input keys for inputting data may be generated by the image output module 230.

The drive module 220 may play the role of driving the control module 220 so that a user can input data based on the input image 270 while the data input apparatus 200 operates. In an embodiment, when based on a user manipulation of an on/off switch, e.g., attached to the data input apparatus 200, the drive module 220 may operate the drive module 220.

The control module 210 may control individual modules in the data input apparatus 200 and, particularly, may determine whether the user has attempted to input data, based on an image input through the image input module 240, for example. Furthermore, the control module 210 may determine which key data selection has been made by the user and provide a corresponding key code.

The image output module 230 may generate the input image 270, e.g., under the control of the control module 210, and the image input module 240 may capture an image of the same, for example. In this case, the image input module 240 may employ a general Charge Coupled Device (CCD), a Complementary Metal-Oxide-Silicon (CMOS) camera, an infrared camera, or the like, noting that alternative embodiments are equally available.

If a determination is made that a plurality of keys have been selected, e.g., by the control module 210, the keypress duplication determination module 250 may select from among the selected plurality of keys to determine which key(s) a user probably intended. This process avoids potential errors in finger placement, e.g., too close between two keys, or potential errors or erroneous detections.

In an embodiment, the storage module 260 may include various pieces of information that would permit the control module 210 to determine whether a user has attempted to input data or which key data selection has been made. According to another embodiment, such information may include, as only an example and if an input image 270 is used, information about the images of keys generated by the input image 270 and information about the key location thereof. In addition, the information may include information about the arrangement of the keys, e.g., information about the relative arrangement of keys with respect to each other.

Thus, according to an embodiment of the present invention, the input image 270 may be used for inputting data. Accordingly, FIGS. 3A to 3D illustrate various embodiments, with differing aspects and/or advantages, of such an input image 270.

Figure 3A:
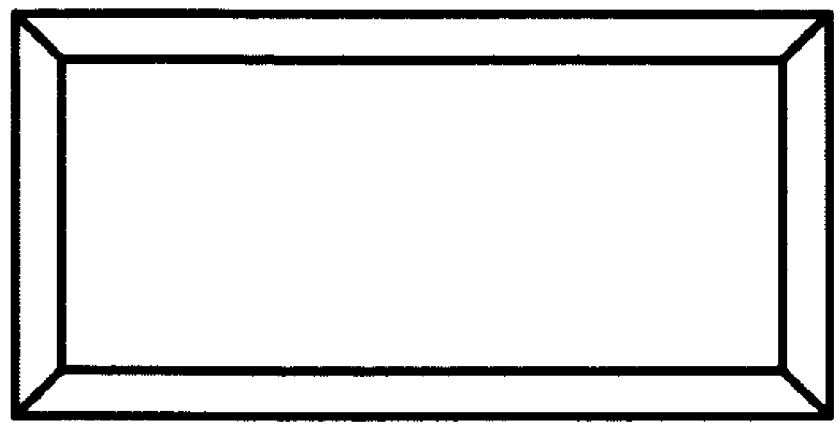
FIGS. 3A to 3D illustrate example input images for inputting data, according to embodiments of the present invention.
Figure 3B:
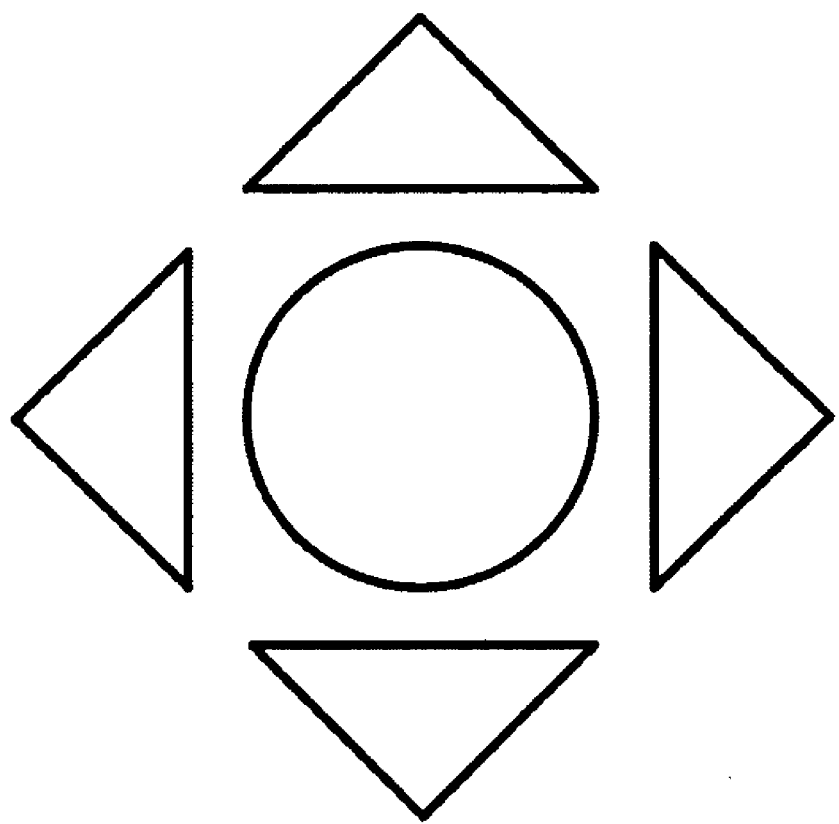
Figures 3C, 3D:
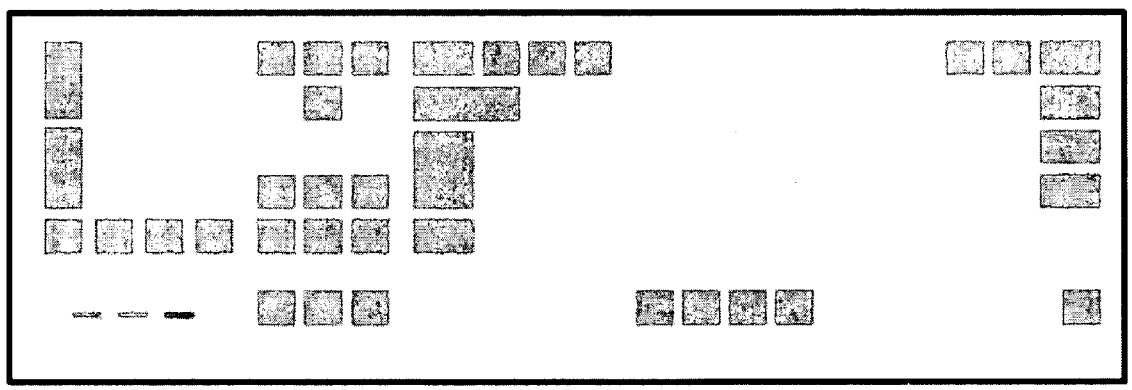

In an embodiment of the present invention, the input image 270 may also include an image of an on/off switch, as shown in FIG. 3A, or an image of four direction keys and one selection key, shown in FIG. 3B. In addition, the input image 270 may include an image of a numeric pad, shown in FIG. 3C, or an image of a keyboard, shown in FIG. 3D. Here, additional and/or different images or devices, e.g., if input image 270 is not used, are equally available, as an embodiment of the present uses a captured image of the same to determine the selection of keys and/or switches, for example.

Operation of the aforementioned respective modules shown in FIG. 2 will now be described in greater detail with reference to the flowcharts in FIGS. 4 through 7.

Figure 4:
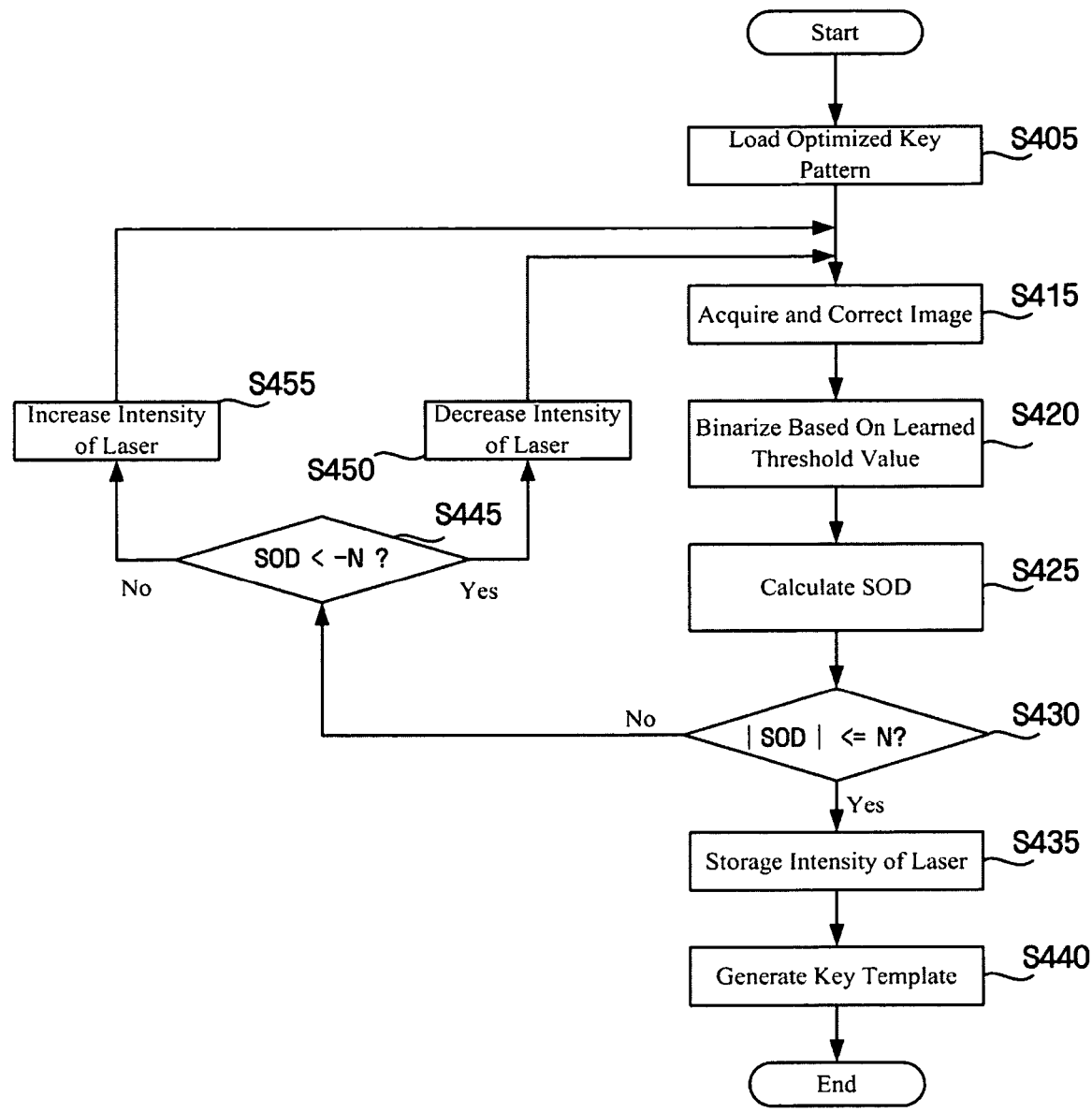
FIG. 4 illustrates an initialization process for data input, according to an embodiment of the present invention.

When the user operates the data input apparatus 200, e.g., through the drive module 220, the data input apparatus 200 may start an initialization operation, as shown in FIG. 4.

The control module 210 may first load optimized key patterns from the storage module 260, for example, in operation S405. The user may optimize the brightness of illumination in a preliminary task. Key images making up the input image 270 may then be captured by the image input module 240, and then stored in the storage module 260, for example, in the form of binarized image patterns. In this case, the binarized image patterns, of the captured key images, stored in the storage module 260 may be optimized key patterns.

The control module 210 may operate the image output module 230 to generate the input image 270, and the image input module 240 may capture the input image 270 and perform correction on the captured input image 270, for example, in operation S415. In this case, the correction may include image undistortion. The term 'image undistortion' refers to the correction of a distortion generated in an image, e.g., in the case where a wide angle lens is used. Representative distortion may include barrel distortion, for example, noting that alternate embodiments are equally available.

After a correction of an input image has been performed, the corrected input image may be transferred to the control module 210.

In this case, the control module 210 binarizes the transferred image, that is, individual images of keys making up the transferred image, using a threshold value learned, according to a predetermined threshold operation, in operation S420. In this case, the threshold value refers to a threshold value determined based on a conventional algorithm, such as adaptive thresholding or dynamic thresholding.

After each corresponding image acquired at operation S415 has been binarized, based on the corresponding threshold value, each of the optimized key patterns, e.g., loaded from the storage module 260, may be compared with the binarized pattern of a corresponding key image, on a pixel basis. Differences between the binary values and the optimized patterns may be calculated, and all of the differences added together, in operation S425. The resulting value is referred to as the "Sum Of Differences (SOD)" value.

In an embodiment of the present invention, if an absolute value of an SOD is less than or equal to a preset reference value N (where N is a positive number and signifies an error range for adjusting laser intensity), in operation S430, information about the intensity of the laser radiating from the image output module 230, e.g., to generate a current input image 270, may be stored in the storage module 260, in operation S435, and a key template may be generated, in operation S440. In this case, the term 'key template' refers to a template formed through a binarization and storage of each, for example, of the input key images making up the captured image, acquired in operation S415. The key template, for example, may include information about key patterns, such as the number of white pixels included in each key image (hereinafter referred to as 'WhiteNum') and the location of each key, and information about the threshold value that was used as a basis for the binarization of the key images.

If the absolute value of the SOD is greater than N, then it may be determined whether the absolute value of the SOD is greater than N, in operation S430, and the control module 210 may further determine whether the SOD is less than –N, in operation S445, i.e., since at this point we know that the absolute value of SOD is greater than N, we then determine whether the SOD is positive or negative to determine whether the captured intensity of the image is respectively too dark or too bright, which would identify a need/desire to respectively increase or decrease the output illumination of the input image 270.

Thus, if the SOD is found to be less than –N, in operation S415, then it can be determined that the image includes a large bright portion, in which case the control module 210 may cause the image output module 230 to decrease the intensity of the laser radiated by the image output module 230, in operation S450. Thereafter, the image input module 240 may again capture the input image 270, in operation S415.

If the SOD is found to be equal to or greater than N, in operation S415, then it can be determined that the image includes a large dark portion, in which case that the control module 210 may cause the image output module 230 to increase the intensity of the laser radiated by the image output module 230, in operation S455. Thereafter, the image input module 240 may again capture the input image 270, in operation S415.

An example of adjusting the intensity of the laser radiated by the image output module 230 is shown in the flowchart of FIG. 4. When the image input module 210, such as a camera, includes the capability of Auto Gain Control (AGC), an AGC, as well as the adjustment of the intensity of the laser, may be performed so that an optimized environment for detecting the selection of a key can be determined.

The above-described initialization process may be performed whenever the data input apparatus 200 is driven by the drive module 220, for example.

Figure 5:
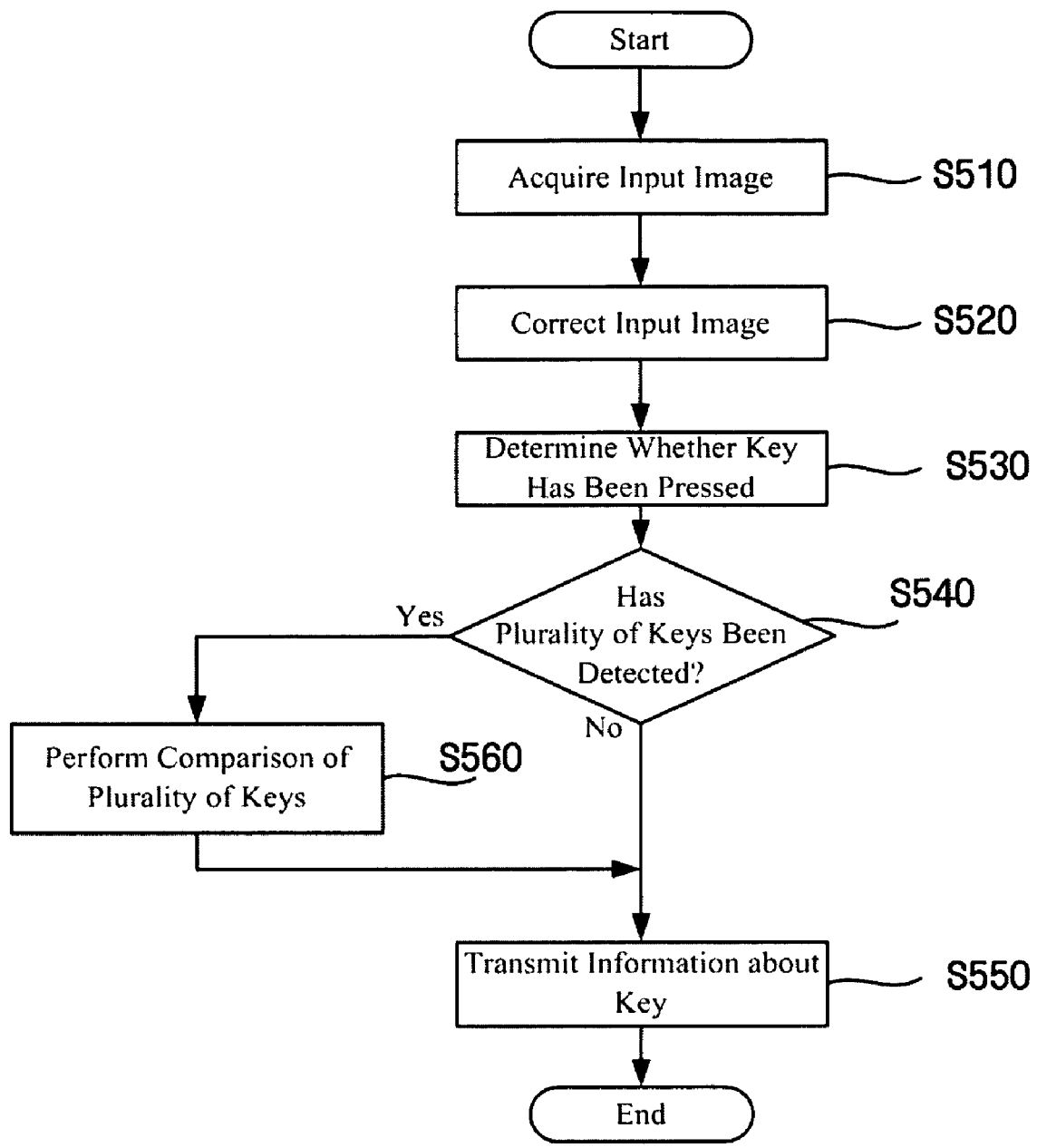
FIG. 5 illustrates a method for detecting a selective data input, according to an embodiment of the present invention.

After the initialization process of the input apparatus 200 has been completed, the detecting of the input of data through the input image 270 may be performed, as shown in FIG. 5.

The image input module 240 may capture an input image 270 at predetermined time intervals, for example, and transfer the acquired input image to the control module 210, in operation S510.

The control module 210 may perform the above-described image distortion correction on the transferred input image, in operation S520, and determine whether one of the keys making up the input image 270 has been selected, in operation S530. The method of determining whether a key has been selected will now be described in greater detail. Binarization may be performed on respective key images using a conventional adaptive thresholding algorithm. If variation in a threshold value is equal to or greater than a predetermined value, it may be determined that variation in a corresponding key image has occurred. Thereafter, the extent of variation between a binarized current key region and a previously stored key may be measured based on SOD, and it is determined that the corresponding key has been selected if the absolute value of the SOD is greater than a predetermined value.

Figure 6:
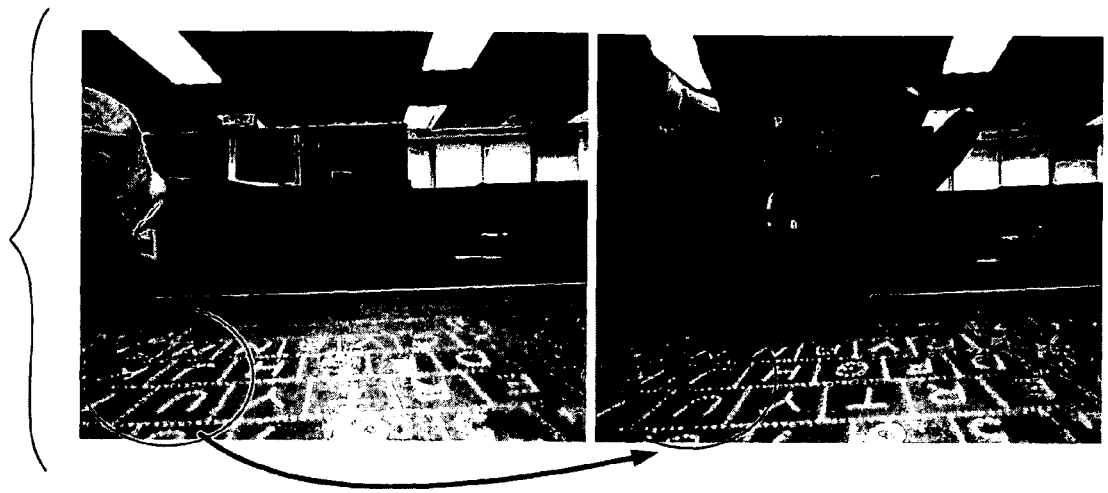
FIG. 6 illustrates a plurality of keys that may be selected and a movement of a finger toward one of the keys, according to an embodiment of the present invention.
Figure 7:
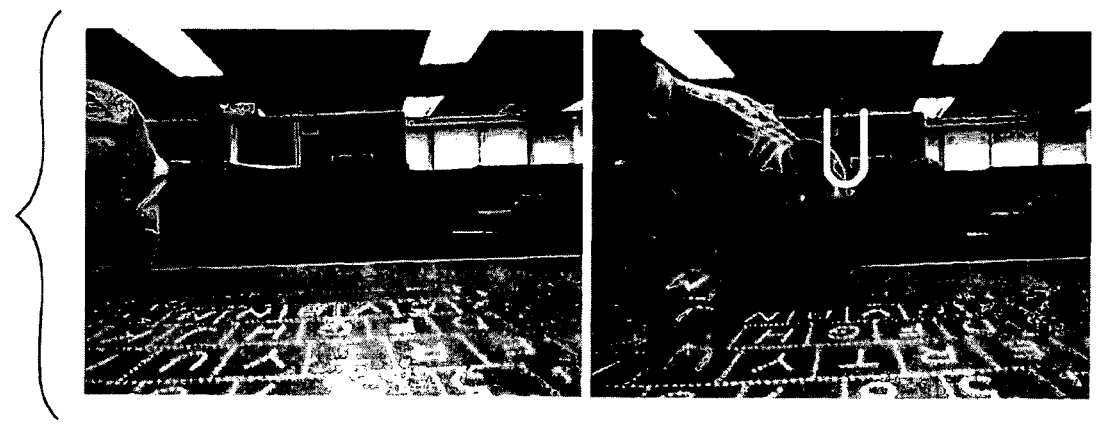
FIG. 7 illustrates a plurality of keys that may be selected and a selection of one of the keys, according to another embodiment of the present invention.

When the user selects a specific key, in the case where there are a plurality of keys making up the input image 270, the patterns and illumination distributions of neighboring keys as well as those of the selected key(s) are affected by the selection, e.g., movement of fingers, such that a determination may be made that that a plurality of keys have been pressed, potentially in error, in operation S530, and as shown in FIGS. 6 and 7.

In FIGS. 6 and 7, a keyboard has been used as an example of the input image 270, but alternate input devices and illuminations are equally available. FIG. 6 demonstrates that the illumination distribution over a keyboard varies when a key is selected, or when a laser beam radiating to/from the keyboard, or light based on a different light source, is blocked by an object, such as a finger. FIG. 7 demonstrates that the patterns of alternate keys vary while a single key is selected.

Accordingly, if it is detected that a plurality of keys have been selected, potentially erroneously, in operation S540, the comparison of the plurality of keys may be implemented to determine which key(s) the user actually intended to select, in operation S560. In this case, the appropriate key(s) meant to be selected by the user may be determined by using the differences between the binarized images of the detected keys and information about the locations thereof.

After the key selected by the user has been determined, in operation S540 or S560, key information about the determined key may be transmitted, in operation S550. In this case, the selection of a key having a certain data value may be determined through comparison between the location of each key stored in the storage module 260, for example, and the location of a key that is determined to have been selected by the user in the input image 270, for example.

An example of such key information may be information about a key code for identifying a respective key.

Figure 8:
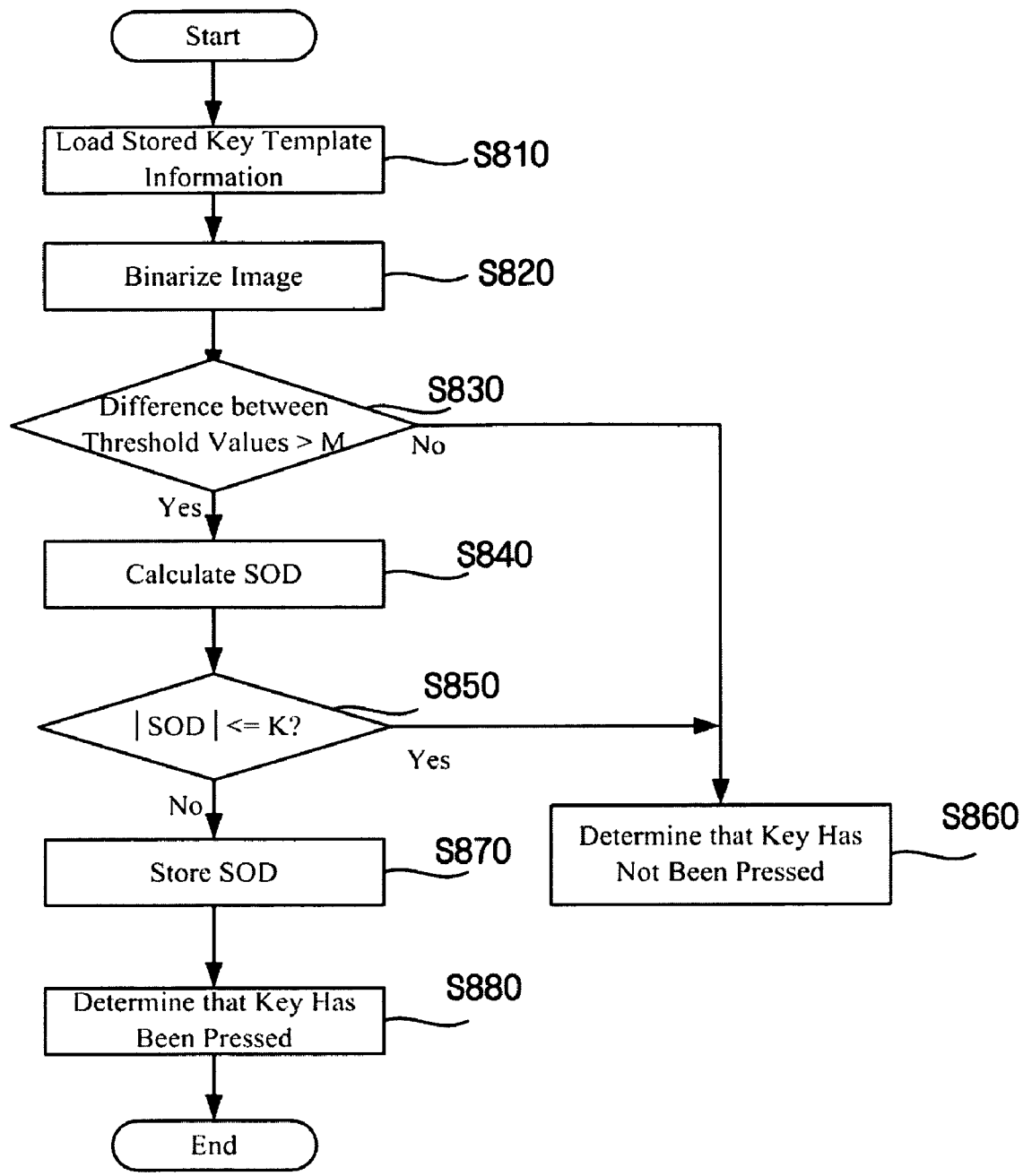
FIG. 8 illustrates a process of determining whether a key has been selected, according to an embodiment of the present invention.

FIG. 8 illustrates a process of determining whether a key has actually been selected, according to an embodiment of the present invention, with an operation S530, described in FIG. 5, being described in greater detail.

The control module 210 may load information about a key template stored in the storage module 260, for example, at operation S810, and binarize the image, which is corrected in operation S520, by applying an adaptive thresholding algorithm to the respective key images of the corrected image, in operation S820.

Generally, the term 'binarization' refers to the converting of an input image, that is, a grayscale image, into an image having values of 0 and 255, for example, using a specific threshold value. In this case, an algorithm, in which a predetermined value is not used as a threshold value and the threshold value is adaptively selected according to the input image, is called an adaptive thresholding algorithm. The adaptive thresholding algorithm is frequently used for region segmentation, and representatively include conventionally known Otsu's and Niblack's methods, for example.

In this case, a threshold value that corresponds to each key image, determined by the adaptive thresholding algorithm, may be compared with a threshold value that is included in the key template information, in operation S830. If the difference therebetween is greater than a predetermined value M (where M is a positive number), the SOD of a corresponding key image may be calculated, in operation S840. In this case, the fact that the difference between the threshold values is greater than the predetermined value M implies that there is currently variation in the corresponding key image.

Meanwhile, if the difference between the threshold values is equal to or less than the predetermined value M, it can be determined that there is insufficient variation in the corresponding key image, such that the control module 210 determines that the input key of the input image 270 has not been selected, in operation S860.

If the difference between the threshold values are greater than the predetermined value M, then after a SOD has been calculated, in operation S840, the control module 210 may determine whether the absolute value of the calculated SOD is greater than a predetermined value K, in operation S850.

Thereafter, if the absolute value of the calculated SOD is less than or equal to the predetermined value K, it may similarly be determined that there is insufficient variation in the corresponding key image, such that the control module 210 may determine that the input key of the input image 270 has not been selected, in operation S860.

In contrast, if the absolute value of the calculated SOD is greater than the predetermined value K, the calculated SOD may be stored in the storage module 260, in operation S870, and then the control module 210 may determine that the corresponding key has been selected, in operation S880.

Meanwhile, as described above, when it being determined whether a key has been selected, in operation S530, a determination may be made that a plurality of keys have been selected, potentially in error. In this case, at least one of these keys must be properly selected, which is shown in FIG. 9.

Figure 9:
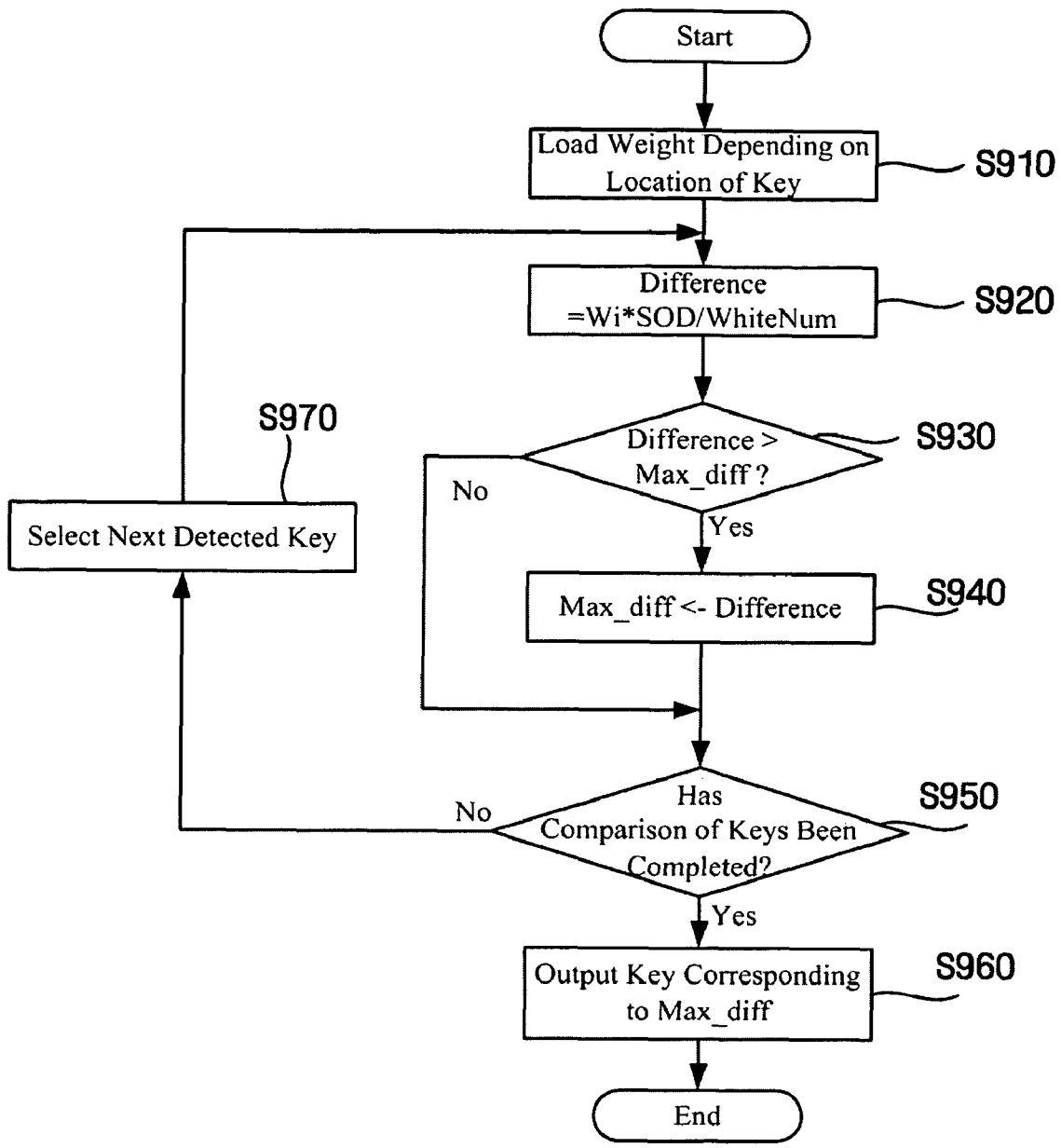
FIG. 9 illustrates a process of performing a comparison between a plurality of potentially selected keys, according to an embodiment of the present invention.

FIG. 9 illustrates a process of comparing a plurality of keys, according to an embodiment of the present invention, in which operation S560, described in FIG. 5, is described in greater detail.

The keypress duplication determination module 250 may load weights $W_i$, which may correspond to the locations of the respective key images determined to have been selected in operation S530, from the storage module 260, in operation S910. Although not shown in FIG. 2, the keypress duplication determination module 250 may directly access the storage module 260, for example.

Here, the storage module 260 may store weights based on the locations of the respective keys making up the input image 270. A greater weight may be assigned to a key image depending on its distance to the user and in inverse proportion to the distance to the data input apparatus 200, for example, noting that alternative weighting embodiments are equally available.

The keypress duplication determination module 250 may multiply the loaded weight of a corresponding key image by a normalized SOD, and then store the result in a variable 'Difference', in operation S920, for example.

In such a case, the normalized SOD may be expressed in a 'SOD/WhiteNum' form using 'WhiteNum' described above. This is because the value of 'WhiteNum' can be different for each key image and.

The keypress duplication determination module 250 may determine whether the value stored in the variable 'Difference' is greater than a predetermined value 'Max_diff', in operation S930. As an example, an initial value of 'Max_diff' may be set to '0'.

If, in operation S930, the value stored in the variable 'Difference' is greater than 'Max_diff,' the value of 'Max_diff' may be reset to the value stored the variable 'Difference', in operation S940, and it may be determined whether a comparison of all of the plurality of keys has been performed, in operation S950. In contrast, if, at operation S930, the value stored in the variable 'Difference' is equal to or less than 'Max_diff', operation S940 may not be performed.

If there remain keys to be compared, in operation S950, a next detected key may be chosen, in operation S970 and then operation S920 may be performed on only that chosen key.

After the comparison of all of the plurality of keys detected, according to the above-described operations in operation S540, is performed, a determination on whether the key corresponding to the value set in 'Max_diff' is the properly selected key may be made, in operation S960.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example. The media may also be a distributed network, so that the computer readable code is stored/transferred and executed in a distributed fashion.

According to embodiments of the present invention, performance at least equal to that of conventional systems can be provided with a much simplified data input apparatus.

Furthermore, according to an embodiment of the present invention, a small-sized data input apparatus can be implemented, and manufacturing costs can be saved, compared to conventional systems.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data input apparatus, comprising:
an image input module to obtain an input image representing at least one selectable input; and
a controller to control a binarizing of at least one respective digital image of at least one respective input from the obtained input image, and to determine selection by a user of the at least one respective selectable input based on a comparison of a corresponding binarized image of the at least one respective digital image with a corresponding previously stored binarized image, wherein binarized images are converted grayscale digital images that have been converted from respective grayscale images to binary images having only a maximum scale and a minimum scale to represent an intensity of each pixel.

2. The apparatus of claim 1, further comprising:
an image output to generate an illumination of light, for forming an illumination on a surface, of the at least one respective selectable input, such that the obtaining of the input image includes a capturing of the illumination of light.

3. The apparatus of claim 2, wherein the at least one respective selectable input is an image of a key representing a key from a keyboard.

4. The apparatus of claim 2, wherein the image output further comprises a charge coupled device (CCD) to capture the illumination light.

5. The apparatus of claim 1, wherein the controller provides information about a key code corresponding to the determined at least one selectable input to control a computational device based upon input of the key code.

6. The apparatus of claim 5, wherein the apparatus further comprises the computational device, with the apparatus being a computer.

7. The apparatus of claim 1, wherein the binarizing of the at least one respective input image is performed based upon a predetermined threshold value, wherein the predetermined threshold value is derived based on an adaptive thresholding algorithm.

8. The apparatus of claim 1, wherein the controller controls a calculating of differences between the corresponding binarized image of the at least one selectable input and the corresponding previously stored binarized image, on a pixel basis, and controls a determining that the at least one selectable input has been selected by the user based upon a sum of the calculated differences being greater than a predetermined value.

9. The apparatus of claim 1, wherein the at least one selectable input includes a power input for controlling a drive module to control a driving of the controller.

10. The apparatus of claim 1, further comprising a keypress duplication determination module determining, wherein there are a plurality of selectable inputs in the obtained input image, which of the plurality of selectable inputs that are identified as having been selected by the user, in the determining of the selection by the user of the at least one respective selectable input, should be an end determination of an actual input selection, when the identification of the selectable inputs results in identifying multiple inputs.

11. The apparatus of claim 10, wherein the keypress duplication determination module determines which of the plurality of selectable inputs has been actually selected by the user based on weights corresponding to relative locations of the selectable inputs in the obtained input image.

12. A method of detecting input of data, comprising:
obtaining an input image representing at least one selectable input;
binarizing at least one respective digital image of at least one respective selectable input from the obtained input image; and
determining selection by a user of the at least one respective selectable input based on a comparison of a corresponding binarized image of the at least one respective digital image with a corresponding previously stored binarized image, wherein binarized images are converted grayscale digital images that have been converted from respective grayscale images to binary images having only a maximum scale and a minimum scale to represent an intensity of each pixel.

13. The method of claim 12, further comprising:
generating an illumination of light, for forming an illumination on a surface, of the at least one respective selectable input, such that the obtaining of the input image includes a capturing of the illumination of light.

14. The method of claim 13, wherein the at least one respective selectable input is an image of a key representing a key from a keyboard.

15. The method of claim 13, wherein the capturing of the illumination light is performed by a charge coupled device (CCD).

16. The method of claim 12, wherein the determining of the selection of the at least one respective selectable input further comprises providing information about a key code corresponding to the determined at least one selectable input to control a computational device based upon input of the key code.

17. The method of claim 12, wherein the binarizing of the at least one respective input image is performed based upon a predetermined threshold value, wherein the predetermined threshold value is derived based on an adaptive thresholding algorithm.

18. The method of claim 12, wherein the determining of the selection of the at least one respective selectable input further comprises:
calculating differences between the corresponding binarized image of the at least one selectable input and the corresponding previously stored binarized image, on a pixel basis; and
determining that the at least one selectable input has been selected by the user based upon a sum of the calculated differences being greater than a predetermined value.

19. The method of claim 12, further comprising:
determining, where there are a plurality of selectable inputs in the obtained input image, which of the plurality of selectable inputs that are identified as having been selected by the user, in the determining of the selection by the user of the at least one respective selectable input, should be an end determination of an actual input selection, when the identification of the selectable inputs results in identifying multiple inputs.

20. The method of claim 19, wherein the determining of which of the plurality of selectable inputs are the actual input selection further comprises:
determining which of the plurality of selectable inputs has been actually selected by the user based on weights corresponding to relative locations of the selectable inputs in the obtained input image.

21. At least one non-transitory computer readable medium comprising computer readable code to control at least one processing element to implement the method of claim 12.

* * * * *